(12) United States Patent
Hsieh et al.

(10) Patent No.: US 8,938,128 B2
(45) Date of Patent: Jan. 20, 2015

(54) WEIGHTED IMAGE ENHANCEMENT METHOD

(71) Applicant: Chunghwa Picture Tubes, Ltd., Taoyuan (TW)

(72) Inventors: Pei-Lin Hsieh, Hsinchu (TW); Hsiang-Tan Lin, Keelung (TW)

(73) Assignee: Chunghwa Picture Tubes, Ltd., Taoyuan County (TW)

( * ) Notice: Subject to any disclaimer, the term of this patent is extended or adjusted under 35 U.S.C. 154(b) by 98 days.

(21) Appl. No.: 13/870,988

(22) Filed: Apr. 26, 2013

(65) Prior Publication Data

US 2014/0185953 A1    Jul. 3, 2014

(30) Foreign Application Priority Data

Jan. 2, 2013    (TW) .............................. 102100034 A

(51) Int. Cl.
*G06K 9/40* (2006.01)
*G06T 5/00* (2006.01)

(52) U.S. Cl.
CPC ...................................... *G06T 5/003* (2013.01)
USPC ........... 382/263; 382/254; 382/260; 382/266; 382/274; 382/199

(58) Field of Classification Search
CPC ............................ G06T 5/0004; H04N 1/4092
USPC ......... 382/254, 260, 266, 274, 190, 199, 263; 358/462
See application file for complete search history.

(56) References Cited

U.S. PATENT DOCUMENTS

| 5,392,137 | A * | 2/1995 | Okubo ......................... 358/462 |
| 6,928,196 | B1 * | 8/2005 | Bradley et al. ................ 382/300 |
| 7,447,377 | B2 * | 11/2008 | Takahira ....................... 382/260 |
| 8,000,549 | B2 * | 8/2011 | Lee et al. ...................... 382/254 |
| 8,189,955 | B2 | 5/2012 | Chien et al. |
| 2010/0321524 | A1 | 12/2010 | Lin et al. |

FOREIGN PATENT DOCUMENTS

| JP | 2008016006 | 1/2008 |
| TW | 201120809 | 6/2011 |
| TW | 201136298 | 10/2011 |

* cited by examiner

*Primary Examiner* — Ali Bayat
(74) *Attorney, Agent, or Firm* — CKC & Partners Co. Ltd.

(57) ABSTRACT

A weighted image enhancement method includes receiving an original image. The original image includes several original pixels. The original image is sharpened to generate a sharpened image. The sharpened image includes several sharpened pixels. Edge detection is performed with respect to the original image to generate a probability of whether each original pixel is on an edge. An enhancement mode setting is received. A corresponding weight table corresponding to the enhancement mode setting is looked up to obtain a corresponding enhancement weight of each original pixel according to the probability of whether each original pixel is on an edge. A weight calculation is performed utilizing each original pixel and its corresponding sharpened pixel according to its corresponding enhancement weight to generate an enhanced image. The enhanced image is displayed by a display unit.

5 Claims, 3 Drawing Sheets

(Weight table for edge enhancement)
200

(Weight table for detail enhancement)
300

WEIGHTED IMAGE ENHANCEMENT METHOD

CROSS-REFERENCE TO RELATED APPLICATION

This application claims the priority benefit of Taiwan application serial no. 102100034, filed Jan. 2, 2013, the full disclosure of which is incorporated herein by reference.

BACKGROUND

1. Technical Field

The present invention relates to a weighted image enhancement method and system.

2. Description of Related Art

As digital era comes, electrical devices have been becoming one of the most essential media of accessing information, knowledge or communicating with others for people. Hence, more and more information among different domains are converted into digital formats through various techniques.

Along with different settings, each of digitalized pictures has its own corresponding resolution. Normally in a picture the higher resolution means the larger file size. Accordingly, the pictures are often set to be in the resolution for general viewing purpose. However, many application softwares available in the market can zoom-in the pictures, which leads to blur or aliasing along the edges of the zoom-in pictures.

Therefore, there is a need to avoid the blur or aliasing along the edges of the zoom-in pictures without enhancing resolution of pictures.

SUMMARY

According to one embodiment of this invention, a weighted image enhancement method is disclosed to perform a weight calculation utilizing original pixels and their corresponding sharpened pixels according to their weight, which corresponds to their probability of being on an edge, to generate an enhanced image. The weighted image enhancement method includes the following steps:

(a) an original image is received, wherein the original image includes several original pixels;

(b) the original image is sharpened to generate a sharpened image, wherein the sharpened image includes several sharpened pixels;

(c) edge detection with respect to the original image is performed to generate a probability value corresponding to whether each original pixel is on an edge;

(d) an enhancement mode setting is received;

(e) a corresponding weight table corresponding to the enhancement mode setting is looked up to obtain a corresponding enhancement weight of each original pixel according to the probability of whether each original pixel is on an edge;

(f) a weight calculation is performed utilizing each original pixel and its corresponding sharpened pixel according to its corresponding enhancement weight to generate an enhanced image; and (g) the enhanced image is displayed by a display unit.

According to another embodiment of this invention, a weighted image enhancement system is disclosed. The weighted image enhancement system includes a data transmission interface, a display unit and a processing unit. The processing unit is electrically connected to the data transmission interface and the display unit. The processing unit includes an image receiving module, a sharpening processing module, a weight looking-up module, a weight calculating module and a display-unit driving module. The image receiving module receives an original image through the data transmission interface. The original image includes several original pixels. The sharpening processing module sharpens the original image to generate a sharpened image. The sharpened image includes several sharpened pixels. The weight looking-up module performs edge detection with respect to the original image to generate a probability of whether each original pixel is on an edge and looks up a corresponding weight table corresponding to an enhancement mode setting to obtain a corresponding enhancement weight of each original pixel according to the probability of whether each original pixel is on an edge. The weight calculating module performs a weight calculation utilizing each original pixel and its corresponding sharpened pixel according to its corresponding enhancement weight to generate an enhanced image. The display-unit driving module drives the display unit to display the enhanced image.

These and other features, aspects, and advantages of the present invention will become better understood with reference to the following description and appended claims. It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
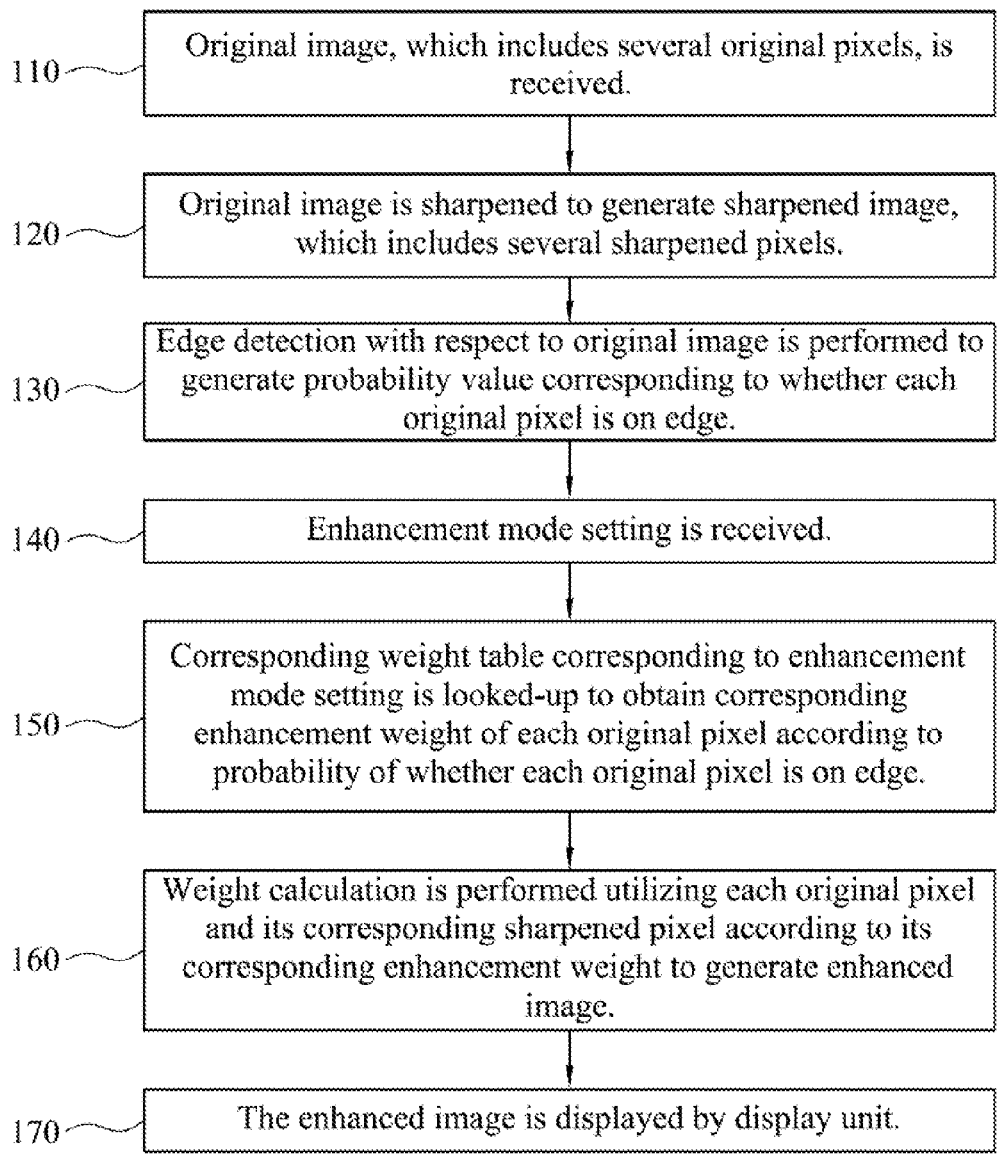
FIG. 1 is a flow diagram that illustrates a weighted image enhancement method according to one embodiment of this invention.

Reference will now be made in detail to the present embodiments of the invention, examples of which are illustrated in the accompanying drawings. Wherever possible, the same reference numbers are used in the drawings and the description to refer to the same or like parts.

Referring to FIG. 1, a flow diagram will be described that illustrates a weighted image enhancement method according to one embodiment of this invention. In the weighted image enhancement method, a weight calculation is performed utilizing original pixels and their corresponding sharpened pixels according to their weight, which corresponds to their probability of being on an edge, to generate an enhanced image. The weighted image enhancement method may take the form of a computer program product stored on a non-transitory computer-readable storage medium having computer-readable instructions embodied in the medium. Any suitable storage medium may be used including non-volatile memory such as read only memory (ROM), programmable read only memory (PROM), erasable programmable read only memory (EPROM), and electrically erasable programmable read only memory (EEPROM) devices; volatile memory such as static random access memory (SRAM), dynamic random access memory (DRAM), and double data rate random access memory (DDR-RAM); optical storage devices such as compact disc read only memories (CD-ROMs) and digital versatile disc read only memories (DVD-ROMs); and magnetic storage devices such as hard disk drives (HDD) and floppy disk drives.

The weighted image enhancement method 100 includes the steps as outlined below.

At step 110, an original image, which includes several original pixels, is received.

At step 120, the original image is sharpened to generate a sharpened image. The sharpened image includes several sharpened pixels. In some embodiments of step 120, the original pixels of the original image are sharpened to generate their corresponding sharpened pixels of the sharpened image.

At step 130, edge detection with respect to the original image is performed to generate a probability value corresponding to whether each original pixel is on an edge. In one embodiment of this invention, gray-scale values (0 to 255) can be utilized to represent the probability of whether each original pixel is on an edge. For example, an original pixel with a high possibility of being on an edge may be assigned with a high value of probability of being on an edge, and an original pixel with a low possibility of being on an edge may be assigned with a low value of probability of being on an edge. other embodiments of this invention, other methods may be utilized to represent the probability of whether each original pixel is on an edge.

At step 140, an enhancement mode setting is received. The enhancement mode setting may be set to an edge enhancement mode or a detail enhancement mode according to users' needs.

At step 150, a corresponding weight table corresponding to the enhancement mode setting is looked up to obtain a corresponding enhancement weight of each original pixel according to the probability of whether each original pixel is on an edge.

At step 160, a weight calculation is performed utilizing each original pixel and its corresponding sharpened pixel according to its corresponding enhancement weight to generate an enhanced image.

At step 170, the enhanced image is displayed by a display unit. Therefore, the image quality displayed on the display unit can be enhanced utilizing the different properties of the original image and its corresponding sharpened image, and limitations with respect to the resolution of the original image are not encountered.

For example, when the enhancement mode setting is set to an edge enhancement mode, the corresponding weight table, which is looked up at step 150, is a weight table for edge enhancement. When the enhancement mode setting is set to a detail enhancement mode, the corresponding weight table, which is looked up at step 150, is eight table for detail enhancement. The weight table for edge enhancement is different from that for detail enhancement.

Figure 2:
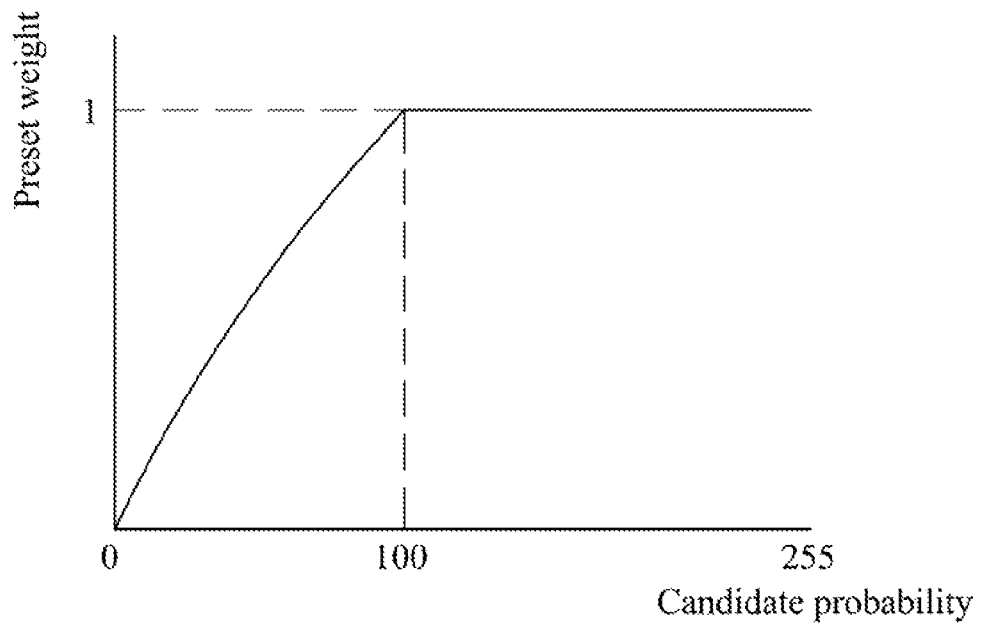
FIG. 2 is an embodiment of a weight table for edge enhancement of the present invention.

Referring to FIG. 2, an embodiment of the weight table for edge enhancement of the present invention is provided. In this embodiment, the weight table for edge enhancement 200 includes several candidate probabilities of being on an edge "0-255" and several preset weights. Each candidate probability of being on an edge (0-255) corresponds to one of the preset weights. Hence, for example, when the probability of whether one of the original pixels is on an edge is "0" and the enhancement mode setting is set to the edge enhancement mode, the weight table for edge enhancement 200 is looked up to obtain the preset weight corresponding to the candidate probability "0" to be taken as the corresponding enhancement weight of such an original pixel. In addition, the preset weights corresponding to the candidate probabilities which are bigger than a probability threshold for edge enhancement "100" may be set to an upper-limit weight for edge enhancement "1." Therefore, the edge of the image may be made clearer by increasing the weight of the sharpened image. The smaller the candidate probabilities which are below the threshold for edge enhancement "100," the smaller the setting of their corresponding preset weights. Hence, in some embodiments of step 160, the following formula may be utilized to perform a weight calculation utilizing each original pixel and its corresponding sharpened pixel according to its corresponding enhancement weight to generate an enhanced image:

$$imE(p)=\alpha \times imS(p)+(1-\alpha) \times imO(p)$$

where imE is the value of the pixel p on the (edge) enhanced image, $\alpha$ is the corresponding enhancement weight of the original pixel p for edge enhancement, imS is the value of the pixel p on the sharpened image, and imO is the value of the pixel p on the original image. In some other embodiments, the weight table for edge enhancement may be adjusted, or a different formula may be utilized for weight calculation, which should not be limited in this disclosure.

Figure 3:
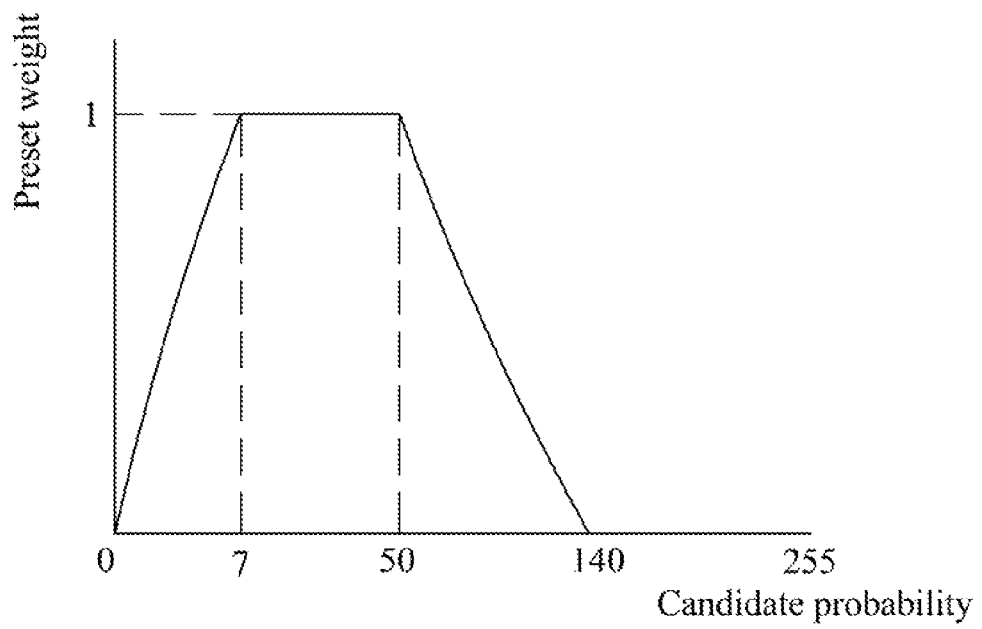
FIG. 3 is an embodiment of eight table for detail enhancement of the present invention.

Referring to FIG. 3, an embodiment of the weight table for detail enhancement of the present invention is provided. In this embodiment, the weight table for detail enhancement 300 includes several candidate probabilities of being on an edge "0-255" and several preset weights. Each candidate probability of being on an edge (0-255) corresponds to one of the preset weights. Hence, for example, when the probability of whether one of the original pixels is on an edge is "0" and the enhancement mode setting is set to the detail enhancement mode, the weight table for detail enhancement 300 is looked up to obtain the preset weight corresponding to the candidate probability "0" to be taken as the corresponding enhancement weight of such an original pixel. In addition, the preset weights corresponding to the candidate probabilities which are bigger than a probability threshold for detail enhancement "140" may be set to a lower-limit weight for detail enhancement "0." Therefore, the details of the image may be maintained by reducing the weight of the sharpened image. The bigger the candidate probabilities which are between the upper-limit probability threshold for detail enhancement "140" and a lower-limit probability threshold for detail enhancement "50," the smaller the setting of their corresponding preset weights. The preset weights corresponding to the candidate probabilities which are smaller than the lower-limit probability threshold for detail enhancement "50" are set to an upper-limit weight for detail enhancement "1." Therefore, the details of the pixels not on an edge of the enhanced image can be improved by increasing the weight of the sharpened image. Hence, in some embodiments of step 160, the following formula may be utilized to perform a weight calculation utilizing each original pixel and its corresponding sharpened pixel according to its corresponding enhancement weight to generate an enhanced image:

$$imD(p)=\beta \times imS(p)+(1-\beta) \times imO(p)$$

where imD is the value of the pixel p on the (detail) enhanced image, $\beta$ is the corresponding enhancement weight of the original pixel p for detail enhancement, imS is the value of the pixel p on the sharpened image, and imO is the value of the pixel p on the original image. In some other embodiments, the weight table for detail enhancement may be adjusted, or a different formula may be utilized for weight calculation, which should not be limited in this disclosure.

Moreover, after sharpening, noise may occur with respect to the pixels with a low probability of being on an edge. Hence, in the weight table for detail enhancement, the preset weights corresponding to the candidate probabilities, which are between the lower-limit probability threshold for detail enhancement "50" and a noise threshold "7," are set to the upper-limit weight for detail enhancement "1." The smaller the candidate probabilities which are smaller than the noise threshold "7," the smaller the setting of their corresponding preset weights. Therefore, a situation in which noise from the sharpened image affects the enhanced image can be avoided.

Figure 4:
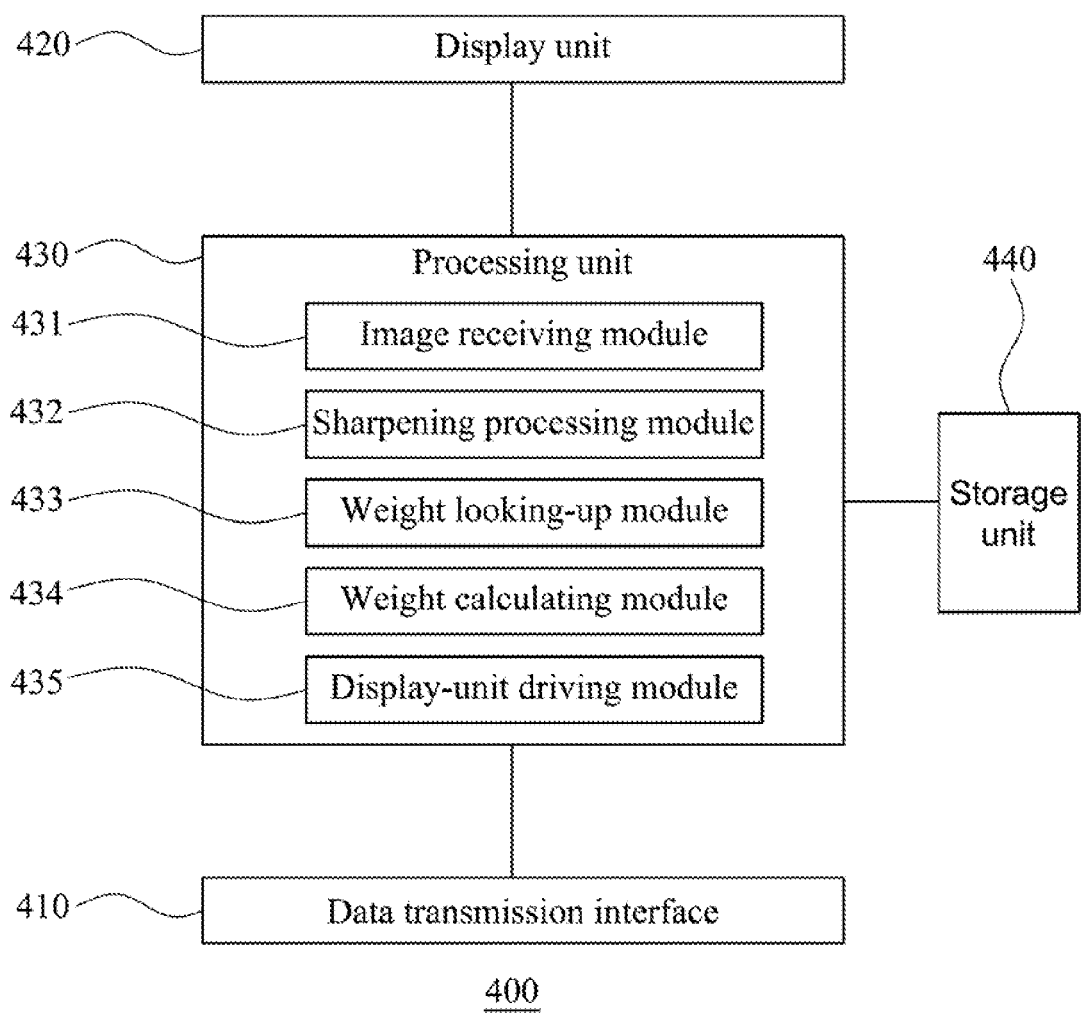
FIG. 4 illustrates a block diagram of a weighted image enhancement system according to an embodiment of this invention.

FIG. 4 illustrates a block diagram of a weighted image enhancement system according to an embodiment of this invention. The weighted image enhancement system 400 includes a data transmission interface 410, a display unit 420 and a processing unit 430. The processing unit 430 is electrically connected to the data transmission interface 410 and the display unit 420.

The data transmission interface 410 may be a network card or any other wired or wireless data transmission interface.

The processing unit 430 includes an image receiving module 431, a sharpening processing module 432, a weight looking-up module 433, a weight calculating module 434 and a display-unit driving module 435. The image receiving module 431 receives an original image through the data transmission interface 410. The original image includes several original pixels.

The sharpening processing module 432 sharpens the original image to generate a sharpened image. The sharpened image includes several sharpened pixels.

The weight looking-up module 433 performs edge detection with respect to the original image to generate a probability of whether each original pixel is on an edge and looks up a corresponding weight table corresponding to an enhancement mode setting to obtain a corresponding enhancement weight of each original pixel according to the probability of whether each original pixel is on an edge. The enhancement mode setting may be received through a user interface, such as a keyboard, a mouse, or a graphical user interface.

The weight calculating module 434 performs a weight calculation utilizing each original pixel and its corresponding sharpened pixel according to its corresponding enhancement weight to generate an enhanced image.

The display-unit driving module 435 drives the display unit 420 to display the enhanced image. Therefore, the image quality displayed on the display unit 420 can be enhanced utilizing the different properties of the original image and its corresponding sharpened image, and limitations with respect to the resolution of the original image are not encountered.

In some embodiments of this invention, the weighted image enhancement system 400 may further include a storage unit 440. The storage unit 440 stores a weight table for edge enhancement and a weight table for detail enhancement. The weight table for edge enhancement is different from the weight table for detail enhancement. When the enhancement mode setting is set to an edge enhancement mode, the weight table corresponding to the enhancement mode setting is the weight table for edge enhancement which is referenced by the weight looking-up module 433. When the enhancement mode setting is set to a detail enhancement mode, the weight table corresponding to the enhancement mode setting is the weight table for detail enhancement which is referenced by the weight looking-up module 433. In other embodiments of this invention, the storage unit 440 may further store any other weight table for different types of enhancement, which should not be limited in this disclosure.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A weighted image enhancement method comprising:
   (a) receiving an original image, wherein the original image comprises a plurality of original pixels;
   (b) sharpening the original image to generate a sharpened image, wherein the sharpened image comprises a plurality of sharpened pixels;
   (c) performing edge detection with respect to the original image to generate a probability value corresponding to whether each original pixel is on an edge;
   (d) receiving an enhancement mode setting;
   (e) looking up a corresponding weight table corresponding to the enhancement mode setting to obtain a corresponding enhancement weight of each original pixel according to the probability of whether each original pixel is on an edge;
   (f) performing a weight calculation utilizing each original pixel and its corresponding sharpened pixel according to its corresponding enhancement weight to generate an enhanced image; and
   (g) displaying the enhanced image by a display unit.

2. The weighted image enhancement method of claim 1, wherein step (e) comprises:
   when the enhancement mode setting is set to an edge enhancement mode, the corresponding weight table corresponding to the enhancement mode setting is a weight table for edge enhancement; and
   when the enhancement mode setting is set to a detail enhancement mode, the corresponding weight table corresponding to the enhancement mode setting is a weight table for detail enhancement, which is different from the weight table for edge enhancement.

3. The weighted image enhancement method of claim 2 wherein:
   the weight table for edge enhancement comprises a plurality of candidate probabilities of being on an edge and a plurality of preset weights, each candidate probability of being on an edge corresponds to one of the preset weights, and the probability of whether each original pixel is on an edge is among the candidate probabilities of being on an edge;
   the preset weights corresponding to the candidate probabilities which are bigger than a probability threshold for edge enhancement are set to an upper-limit weight for edge enhancement; and
   the smaller the candidate probabilities which are smaller than the threshold for edge enhancement, the smaller the setting of their corresponding preset weights.

4. The weighted image enhancement method of claim 2, wherein:
   the weight table for detail enhancement comprises a plurality of candidate probabilities of being on an edge and a plurality of preset weights, each candidate probability of being on an edge corresponds to one of the preset weights, and the probability of whether each original pixel is on an edge is among the candidate probabilities of being on an edge;

the preset weights corresponding to the candidate probabilities which are bigger than an upper-limit probability threshold for detail enhancement are set to a lower-limit weight for detail enhancement;

the bigger the candidate probabilities which are between the upper-limit probability threshold for detail enhancement and a lower-limit probability threshold for detail enhancement, the smaller the setting of their corresponding preset weights; and the preset weights corresponding to the candidate probabilities which are smaller than the lower-limit probability threshold for detail enhancement are set to an upper-limit weight for detail enhancement.

5. The weighted image enhancement method of claim 4, wherein:

the preset weights corresponding to the candidate probabilities which are between the lower-limit probability threshold for detail enhancement and a noise threshold are set to the upper-limit weight for detail enhancement; and the smaller the candidate probabilities which are smaller than the noise threshold, the smaller the setting of their corresponding preset weights.

* * * * *